(12) United States Patent  
Hofer

(10) Patent No.: US 8,221,056 B2  
(45) Date of Patent: Jul. 17, 2012

(54) MIXING HOTTER STEAM WITH COOLER STEAM FOR INTRODUCTION INTO DOWNSTREAM TURBINE

(75) Inventor: Douglas Carl Hofer, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 492 days.

(21) Appl. No.: 12/482,791

(22) Filed: Jun. 11, 2009

(65) Prior Publication Data

US 2010/0316488 A1     Dec. 16, 2010

(51) Int. Cl.  
*F01D 25/12* (2006.01)

(52) U.S. Cl. ............... 415/116; 415/117; 415/168.2; 60/667

(58) Field of Classification Search ............ 415/116, 415/117, 144, 168.1, 168.2; 60/618, 657, 60/670, 677  
See application file for complete search history.

(56) References Cited

U.S. PATENT DOCUMENTS

| | | | | |
|---|---|---|---|---|
| 3,972,196 A | * | 8/1976 | Silvestri, Jr. | 60/677 |
| 4,292,259 A | * | 9/1981 | Roth et al. | 261/123 |
| 4,576,008 A | * | 3/1986 | Silvestri, Jr. | 60/662 |
| 5,454,689 A | * | 10/1995 | Falavigna | 415/112 |
| 6,345,952 B1 | * | 2/2002 | Oeynhausen et al. | 415/100 |
| 6,443,690 B1 | * | 9/2002 | Zabrecky et al. | 415/29 |
| 6,644,012 B2 | * | 11/2003 | Hoffmann et al. | 60/39.182 |
| 6,695,575 B1 | * | 2/2004 | Sasse et al. | 415/107 |
| 6,782,703 B2 | | 8/2004 | Dovali-Solis | |
| 7,488,153 B2 | * | 2/2009 | Reigl | 415/177 |
| 7,553,568 B2 | * | 6/2009 | Keefer | 429/411 |

FOREIGN PATENT DOCUMENTS

| | | | |
|---|---|---|---|
| JP | 55125301 | * | 9/1980 |
| JP | 56-115801 | * | 9/1981 |

* cited by examiner

*Primary Examiner* — Edward Look  
*Assistant Examiner* — Liam McDowell  
(74) *Attorney, Agent, or Firm* — Hoffman Warnick LLC; Ernest G. Cusick

(57) ABSTRACT

Apparatus and methods are presented for mixing a high temperature steam, perhaps leaked from an upstream turbine, with the cooler steam from a lower temperature, downstream turbine and introducing the mixture into the downstream turbine.

20 Claims, 5 Drawing Sheets

L0, L1, L2, L3 or L4

L0, L1, L2, L3 or L4    L1, L2, L3 or L4

MIXING HOTTER STEAM WITH COOLER STEAM FOR INTRODUCTION INTO DOWNSTREAM TURBINE

BACKGROUND OF THE INVENTION

The invention relates generally to steam turbines. More particularly, the invention relates to mixing at least a portion of a flow of hotter steam, perhaps leaked from a first turbine, with cooler steam from a second turbine, and introducing the mixture into the second turbine.

Current turbo-machines such as steam turbines often employ multiple casings having turbines coupled to a common rotating shaft operable at different temperatures and pressures. For example, a steam turbine may include a high pressure (HP) casing, an intermediate pressure (IP) casing and a low pressure (LP) casing. Each casing may include a turbine having a plurality of stages therein with each stage including a row of blades that are coupled to the rotating shaft. Pressurized steam forces rotation of the blades as the steam presses against them and passes to the next stage. To contain the steam within a respective casing, each casing includes a series of non-contacting gland seals, referred to as an end packing. Each end packing includes a number of non-contacting seals such as leaf seals, brush seals, labyrinth seals, etc., that partially seal against the rotating shaft of the steam turbine. Due to the finite clearance in these seals there is an inevitable leakage of steam. The rate of leakage is dependent upon the seal geometry, clearance, and temperature difference between the steam inside the casing and the air outside the casing.

In steam turbines having an HP casing, a portion of steam that leaks through the HP end packing in excess of what is required by the steam seal regulator is dumped to a condenser, which results in lost potential to produce rotating shaft work. In theory, the steam could be admitted to the LP casing's turbine to generate useful work. However, in practice, the steam is too hot to admit it directly to the LP turbine because the material limit of LP turbine is exceeded, which makes it incapable of handling the temperature of the HP section steam.

BRIEF DESCRIPTION OF THE INVENTION

A first aspect of the disclosure provides a steam turbine comprising: a first casing including a first turbine operably coupled to a rotating shaft and operable at a first temperature and an end packing for partially sealing the first casing with the rotating shaft; a steam seal regulator for accepting a flow of steam from the end packing; a second casing including a second turbine operably coupled to a rotating shaft and operable at a second temperature that is less than the first temperature; and an ejector for forming a mixture of at least a portion of the flow of steam from the steam seal regulator and a portion of steam removed from an upstream chamber of a given stage of the second turbine and introducing the mixture into the second turbine.

A second aspect of the disclosure provides an apparatus comprising: an ejector for forming a mixture of: steam from a source having a first temperature, and a portion of steam removed from an upstream chamber of a given stage of a turbine that is operable at a second temperature that is less than the first temperature, and introducing the mixture into the turbine.

A third aspect of the invention is directed to a steam turbine comprising: a turbine operable at a first temperature; a source of steam, the steam having a second temperature that is higher than the first temperature; and an ejector for forming a mixture of at least a portion of a flow of steam from the source of steam and a portion of steam removed from an upstream chamber of a given stage of the turbine and introducing the mixture into the turbine.

DETAILED DESCRIPTION OF THE INVENTION

At least one embodiment of the present invention is described below in reference to its application in connection with and operation of a steam turbine. However, it should be apparent to those skilled in the art and guided by the teachings herein that the present invention is likewise applicable to any suitable turbine and/or engine. Embodiments of the present invention provide apparatuses and methods for mixing a high temperature steam with the cooler steam from a lower temperature turbine to mitigate the concerns with temperature mis-match. The mixing may be achieved using an ejector in the form of a fluid driven pump, e.g., either a traditional ejector or a flow amplifier based on the Coandă effect (i.e., tendency of a fluid flow to stay attached to an adjacent curved surface). If steam from the injection location is used to mix and cool the hotter admission steam, the required pressure rise is very low and large mixing ratios can be achieved with the ejector. If less mixing flow is needed, then an ejector can be used to draw steam from a lower pressure stage and re-introduce it to a preceding stage (upstream) for additional performance benefits. In both cases, because the hotter steam is mixed with lower temperature steam from the LP turbine, the temperature is reduced.

Figure 1:
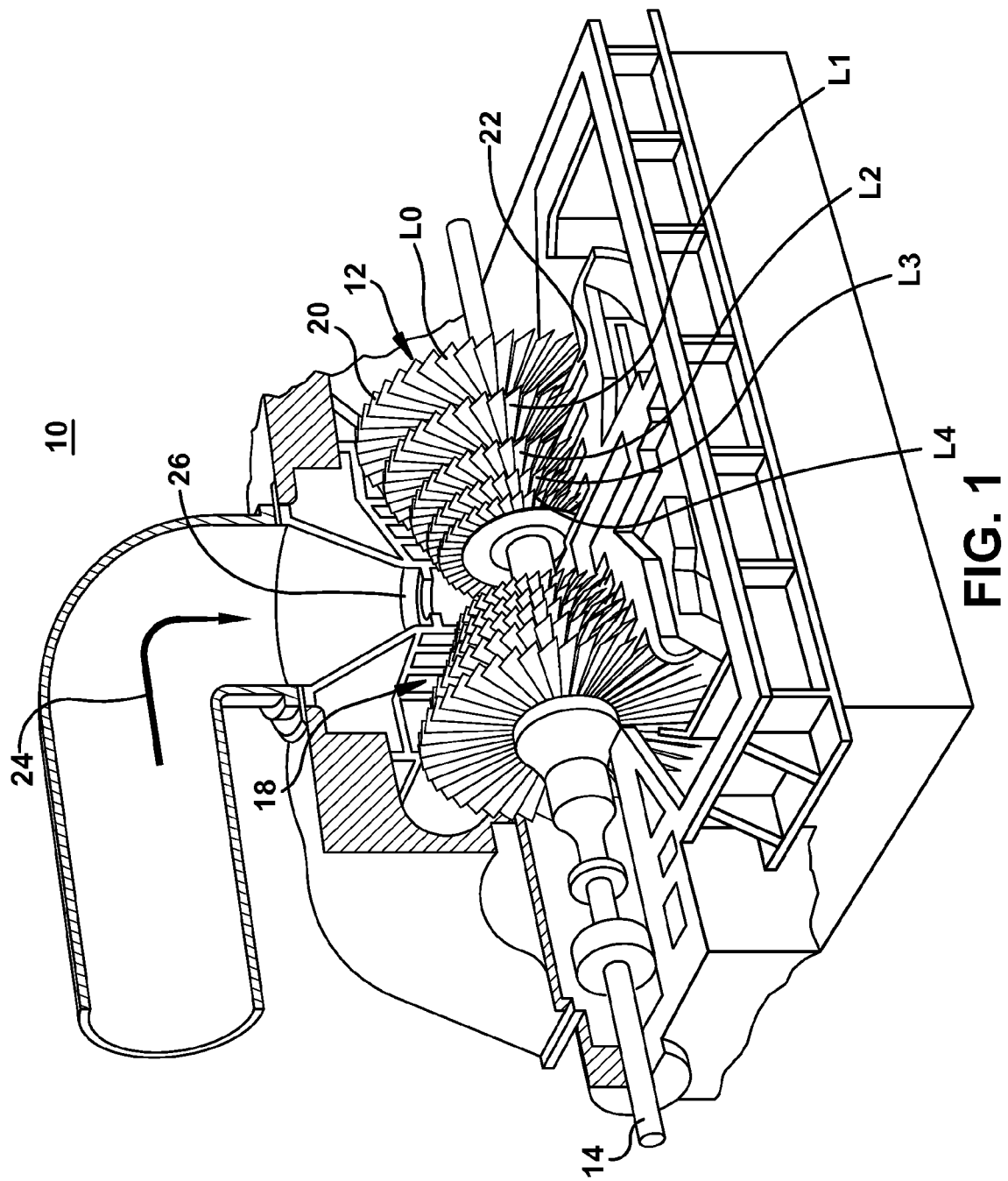
FIG. 1 is a perspective partial cut-away illustration of a steam turbine.

Referring to the drawings, FIG. 1 shows a perspective partial cut-away illustration of a steam turbine 10. Steam turbine 10 includes a rotor 12 that includes a rotating shaft 14 and a plurality of axially spaced rotor wheels 18. A plurality of rotating blades 20 are mechanically coupled to each rotor wheel 18. More specifically, blades 20 are arranged in rows that extend circumferentially around each rotor wheel 18. A plurality of stationary vanes 22 extends circumferentially around shaft 14, and the vanes are axially positioned between adjacent rows of blades 20. Stationary vanes 22 cooperate with blades 20 to form a stage and to define a portion of a steam flow path through turbine 10. In operation, steam 24 enters an inlet 26 of turbine 10 and is channeled through stationary vanes 22. Vanes 22 direct steam 24 downstream against blades 20. Steam 24 passes through the remaining stages imparting a force on blades 20 causing shaft 14 to rotate. At least one end of turbine 10 may extend axially away from rotor 12 and may be attached to a load or machinery (not shown) such as, but not limited to, a generator, and/or another turbine.

In one embodiment of the present invention as shown in FIG. 1, turbine 10 comprises five stages. The five stages are referred to as L0, L1, L2, L3 and L4. Stage L4 is the first stage and is the smallest (in a radial direction) of the five stages. Stage L3 is the second stage and is the next stage in an axial direction. Stage L2 is the third stage and is shown in the middle of the five stages. Stage L1 is the fourth and next-to-last stage. Stage L0 is the last stage and is the largest (in a radial direction). It is to be understood that five stages are shown as one example only, and a turbine may have more or less than five stages. Also, as will be described herein, the teachings of the invention do not require a multiple stage turbine.

Figure 2A:
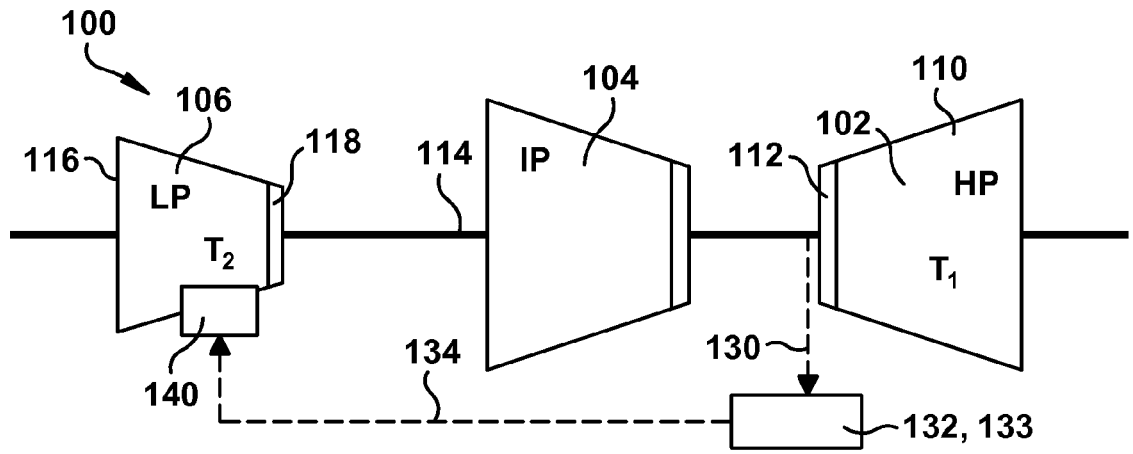
FIGS. 2A-2C show schematic views of illustrative steam turbines.
Figure 2B:
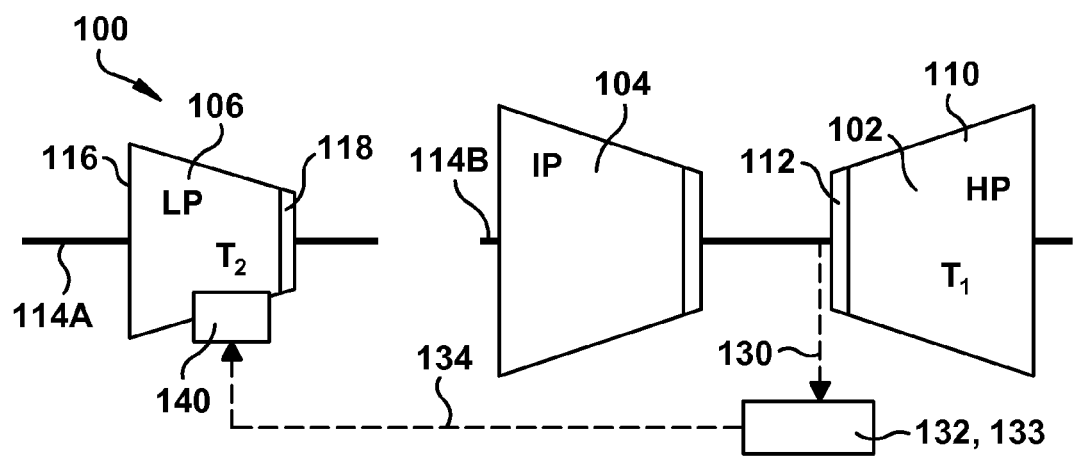
Figure 2C:
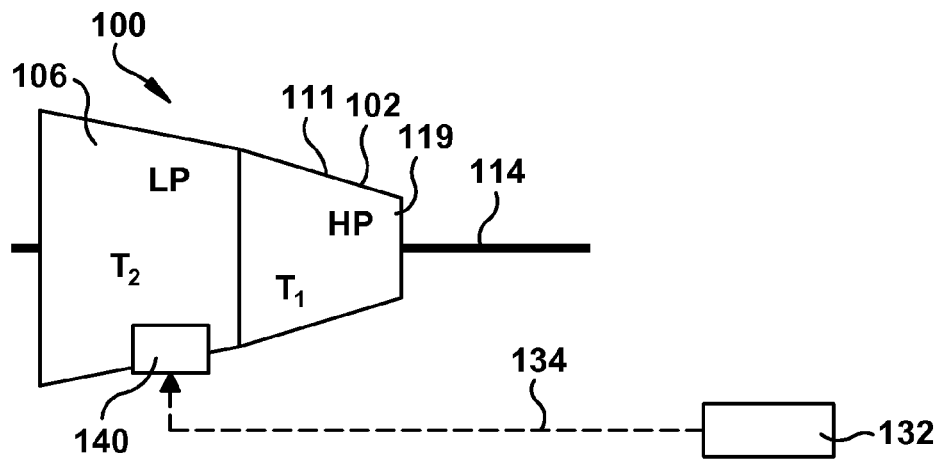

FIGS. 2A-2C show schematic diagrams of illustrative steam turbines 100 in accordance with an embodiment of the present invention. As shown in FIG. 2A, a large steam turbine unit may actually include several turbines that are all co-axially coupled to the same rotating shaft 114. Alternatively, as shown in FIG. 2B, one or more turbines may be coupled to different rotating shafts 114A, 114B. In any event, such a unit may, for example, include a high pressure (HP) turbine 102, an intermediate pressure (IP) turbine 104, and a low pressure (LP) turbine 106. More particularly, as shown in FIG. 2A, steam turbine 100 may include a first casing 110 including a first (HP) turbine 102 operably coupled to rotating shaft 114 and operable at a first temperature $T_1$. The first temperature $T_1$ may be a high temperature that may be, for example, greater than 700° F. (about 370° C.); however, other temperatures may be employed. As understood, casing 110 includes and an end packing 112 for partially sealing first casing 110 with rotating shaft 114. Similar end packings may be employed for other casings relative to rotating shaft 114 or rotating shaft 114A, 114B (FIG. 2B) as the case may be. The casings may be made of a material such as stainless steel or steel alloyed with chromium, molybdenum, vanadium, and/or other elements to improve its strength at elevated temperatures. It is understood that the drawings are not to scale and that LP steam turbines may be larger than either HP or IP turbines. In another alternative embodiment, as shown in FIG. 2C, more than one turbine 102, 106 may be positioned within the same casing 111.

Turbines 102, 104, 106 include similar structure, but operate at different temperatures and pressures. For example, a second casing 116 may include second (LP) turbine 106 operably coupled to rotating shaft 114 (FIG. 2A) or rotating shaft 114A (FIG. 2B) and operable at a second temperature $T_2$ that is less than first temperature T1. The second temperature $T_2$ may be a relatively low temperature that may range, for example, from about 200° F. (about 90° C.) to about 300° F. (about 150° C.); however, other temperatures may be employed. Casing 116 also includes an end packing 118 for partially sealing casing 116 with rotating shaft 114 (FIG. 2A) or rotating shaft 114A (FIG. 2B). Casing 116 may be made, for example, from carbon steel having a temperature limit of about 700° F. (about 370° C.). Turbine 104 may operate at an intermediate temperature that may range, for example, from about 350° C. to about 600° C. Turbine 104 may also be constructed of high alloy content steel capable of high temperatures (similar to the HP casing). In an alternative embodiment, shown in FIG. 2C, a single casing 111 may include first and second (LP) turbines 102, 106 operably coupled to rotating shaft 114 with a single end packing 119. Second turbine 106 may be operable at a second temperature $T_2$ that is less than first temperature T1 of first turbine 102. The second temperature $T_2$ may be a relatively low temperature that may range, for example, from about 200° F. (about 90° C.) to about 300° F. (about 150° C.); however, other temperatures may be employed. Casing 111 may include material similar to that described above.

An end packing 112, 118, 119 includes a number of non-contacting seals such as leaf seals, brush seals, labyrinth seals, etc., that partially seal against the rotating shaft of the steam turbine. Due to the finite clearance in these seals there is an inevitable leakage of steam that results in lost potential to produce rotating shaft work. The rate of leakage is dependent upon the seal geometry, clearance, and pressure difference between the steam inside the casing and the air outside the casing.

As shown in FIGS. 2A-2B, a flow of steam 130 leaking from end packing 112 is captured and accepted as a source of steam 132 (hereafter "steam source 132"). In the FIG. 2A-2B examples, steam source 132 is constituted as a steam seal regulator 133. Steam seal regulator 133 takes the leakage steam and reduces its pressure to a level suitable to be supplied as seal steam for other end packings. As indicated in FIG. 2C, steam source 132 may, however, include any now known or later developed source of steam that has a temperature higher than that suitable for second (LP) turbine 106 and a pressure lower than that suitable for second (LP) turbine 106. In terms of the steam seal regulator embodiments (FIGS. 2A-2B), typically, excess seal steam beyond that required by the steam seal regulator to supply sealing steam for other end packings is dumped to a condenser (not shown). This dumping occurs because the pressure of the steam is too low for use other than in second (LP) turbine 106 and the temperature is too high for the materials typically used to construct the second (LP) turbine. In any event, steam from steam source 132 has a temperature that is mismatched for use with the materials of second turbine 106 and casing 116 and a pressure that is mismatched for use in first (HP) turbine 102 and IP turbine 104. In accordance with an embodiment of the present invention, however, at least a portion 134 of the flow of steam from steam source 132 is re-directed for introduction into second turbine 106 by an ejector 140 (FIGS. 3-6), 240 (FIGS. 7-8) after mixing with cooler steam from second turbine 106.

Figure 3:
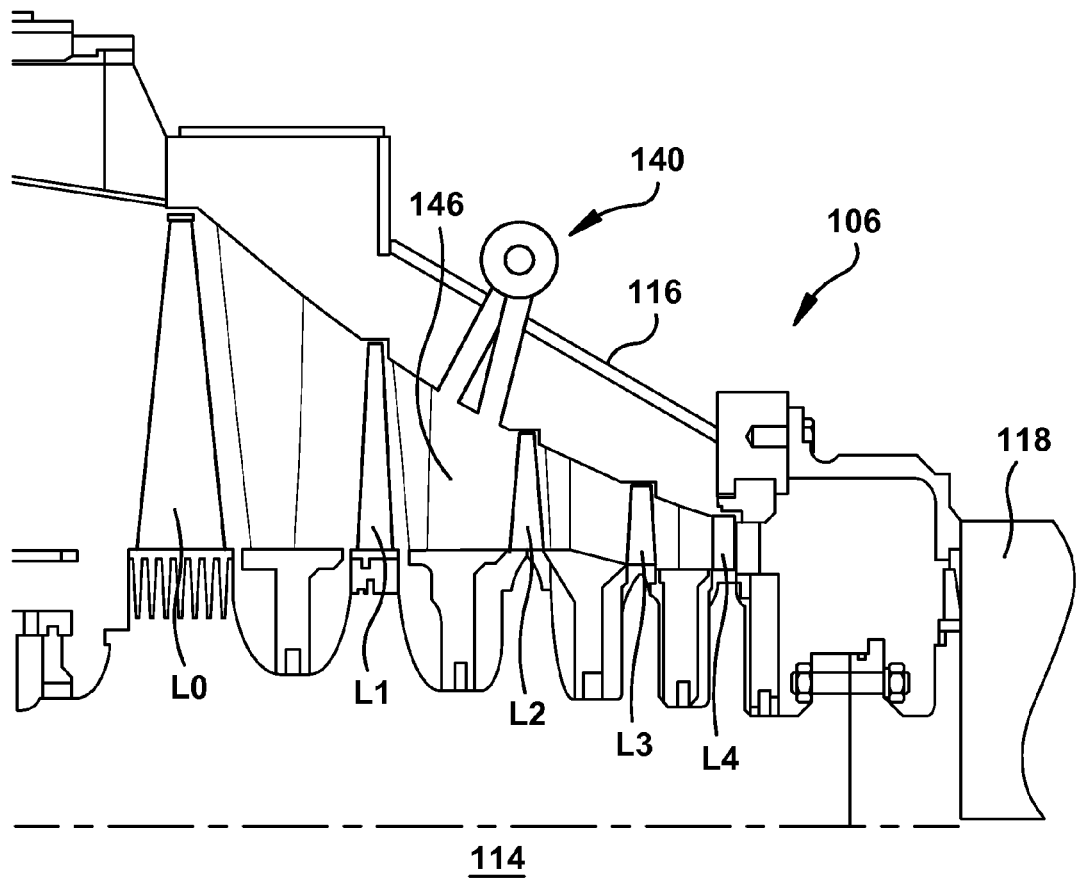
FIG. 3 shows a partial cross-sectional view of a steam turbine including an ejector according to one embodiment of the present invention.
Figure 4:
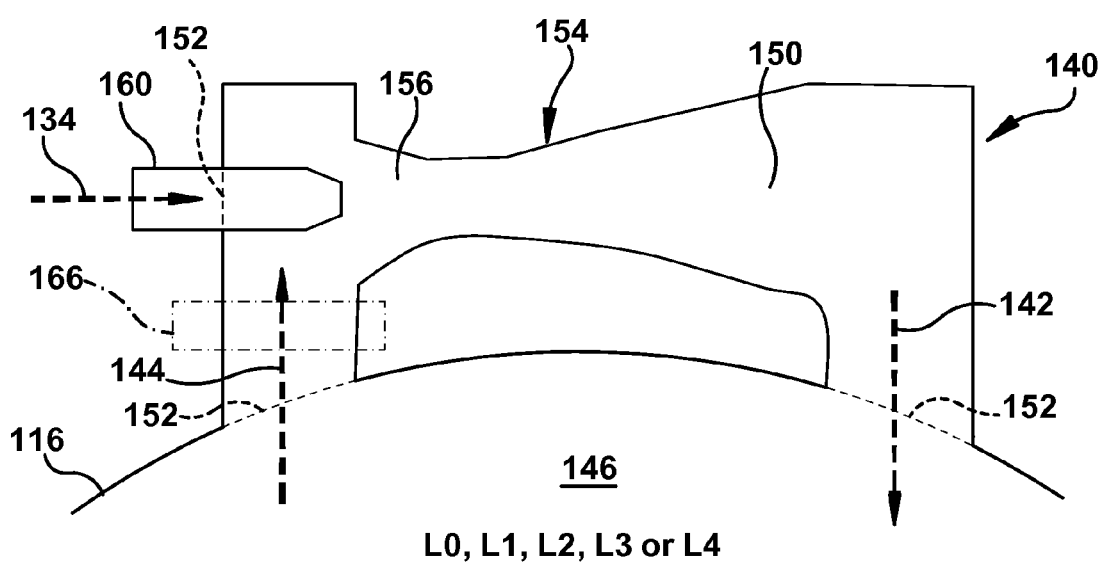
FIG. 4 shows a schematic cross-sectional view of the ejector per FIG. 3.

Referring to FIGS. 2A-4, one embodiment of an ejector 140 is illustrated. FIG. 3 shows a partial cross-sectional view of second turbine 106, and FIG. 4 shows a schematic cross-sectional view of ejector 140. In this embodiment, ejector 140 is mounted to an exterior of casing 116 of second turbine 106 to provide as low a pressure drop as possible. Ejector 140 may be mounted farther from second turbine 106, if required. As shown best in FIG. 4, ejector 140 forms a mixture 142 of at least a portion 134 of the flow of steam from steam source 132 and a portion of steam 144 removed from an upstream chamber 146 of a given stage (e.g., L0, L1, L2, L3, L4) (L1 as shown) of second turbine 106 and introduces mixture 142 into second turbine 106. Portion 134 may include the excess flow from steam seal regulator 132 or steam from another source.

Ejector 140 may include a chamber 150 mounted externally to second casing 116 using any now known or later developed structure. Chamber 150 includes openings 152 in fluid communication (via passages, as necessary) with an interior of second casing 116 and steam source 132 (FIGS. 2A-2C). Ejector 140 includes a diffuser 154 mounted in chamber 150 having an input 156 for receiving at least a portion 134 of the flow of steam from steam source 132 (FIGS. 2A-C) and portion 144 of steam removed from the given stage of second turbine 106. While ejector 140 is shown with chamber 150 shaped to form diffuser 154, it is understood that diffuser 154 may be provided as a separate structure. Ejector 140 may further include a nozzle 160 mounted in chamber 150 for introducing the at least a portion 134 of the flow of steam from steam source 132 (FIGS. 2A-2C) to input 156 of diffuser 154. In this manner, a flow of steam from the nozzle pulls portion 144 of steam from an upstream chamber 146 (i.e., a bowl) of the given stage of the second turbine, forming a fluid pump. In an alternative embodiment, nozzle 160 may be eliminated and a mechanical pump 166 (shown in phantom)(e.g., a fan or compressor) may be employed for pulling steam portion 144 from upstream chamber 146 of the given stage.

The hotter steam portion 134 from steam source 132 may have a temperature of, for example, greater than about 700° F. (about 370° C.), and cooler steam portion 144 from second turbine 106 may have a temperature of, for example, about 200° F. (about 90° C.) to about 300° F. (about 150° C.). When steam portions 134 and 144 are mixed within ejector 140, mixture 142 forms having a temperature greater than that previously present at the location where the mixture is introduced into second turbine 106. Hence, ejector 140 mitigates material temperature limitation concerns by mixing the hotter steam portion 134 with cooler steam portion 144 taken from second turbine 106 such that the resulting mixture is nearer to the local temperature of second turbine 106.

In FIGS. 3-4, mixture 142 is introduced into upstream chamber 146 of the given stage from which steam portion 144 is taken. That is, mixture 142 is introduced into upstream chamber 146 of the same stage from which steam portion 144 is pulled. This embodiment, hence, does not require a multiple stage turbine.

Figure 5:
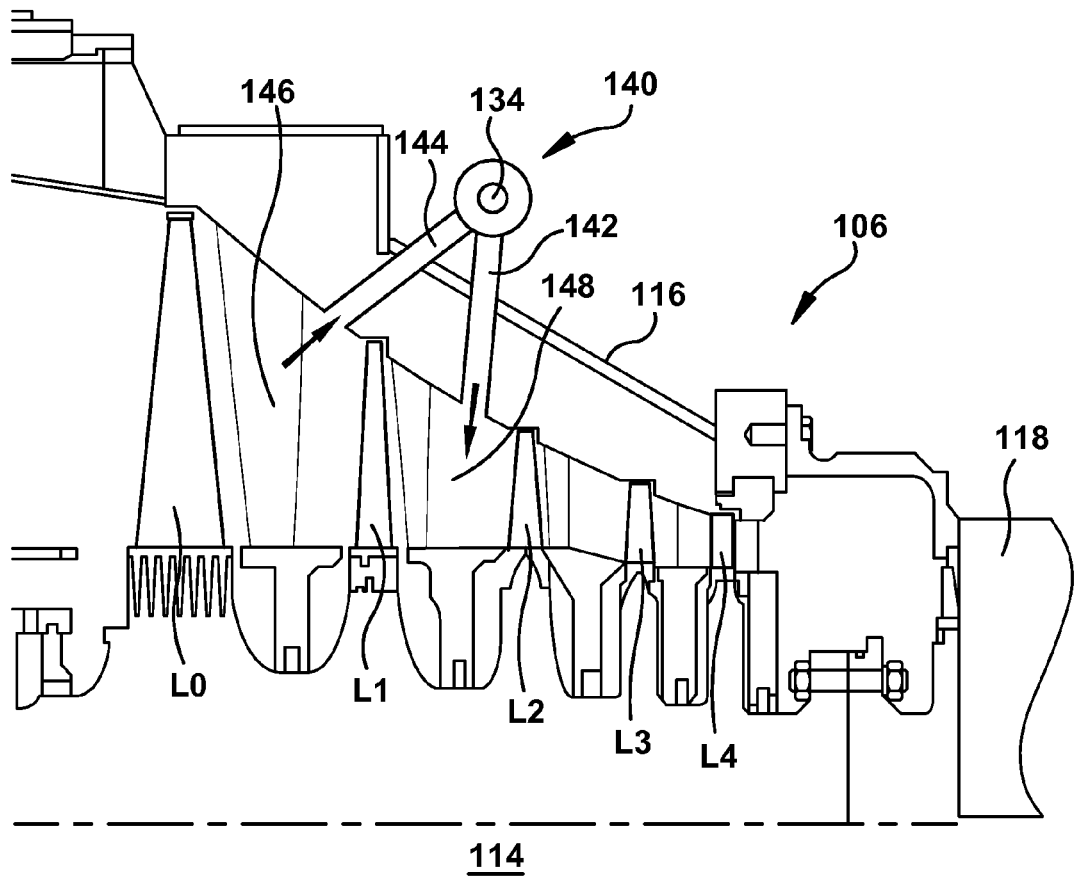
FIG. 5 shows a partial cross-sectional view of a steam turbine including an ejector according to another embodiment of the present invention.
Figure 6:
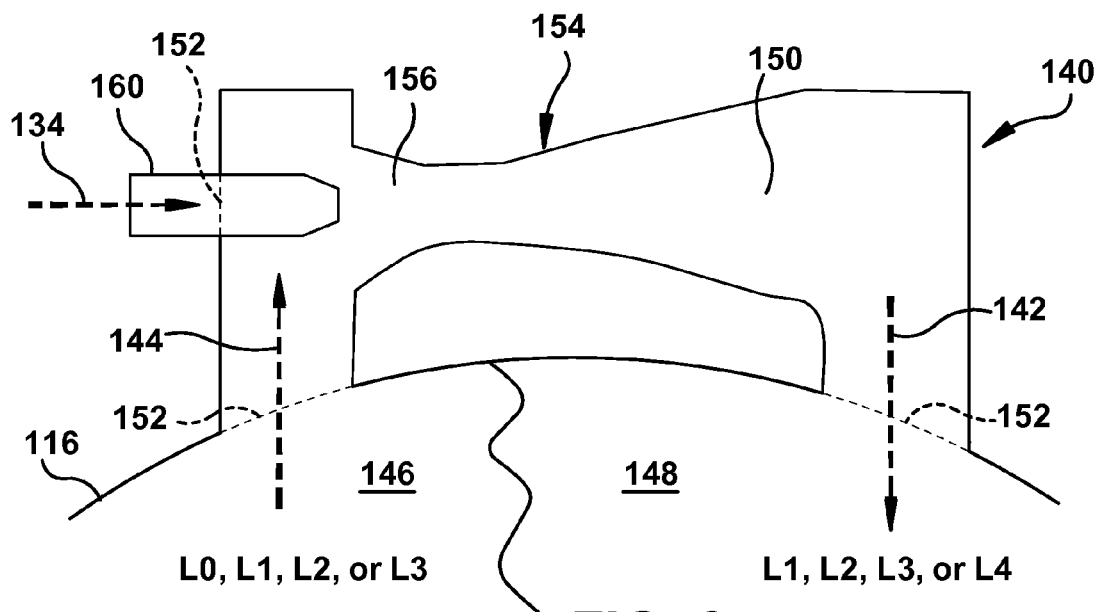
FIG. 6 shows a schematic cross-sectional view of the ejector per FIG. 5.

In another embodiment, shown in FIGS. 5-6, mixture 142 is introduced into a upstream chamber 148 (i.e., bowl) of a preceding, different stage of second turbine 106 than the given stage. For example, as illustrated, steam portion 144 may be pulled from upstream chamber 146 of stage L0 and mixture 142 is formed by mixing with higher temperature steam flow 134 and introduced into upstream chamber 148 of preceding, different stage L1. In this case, second turbine 106 must include a plurality of stages. This embodiment may be useful where less mixing is needed. Although, mixture 142 is shown being introduced into an immediately preceding stage, it may be introduced into any one or more preceding stage(s).

Figure 7:
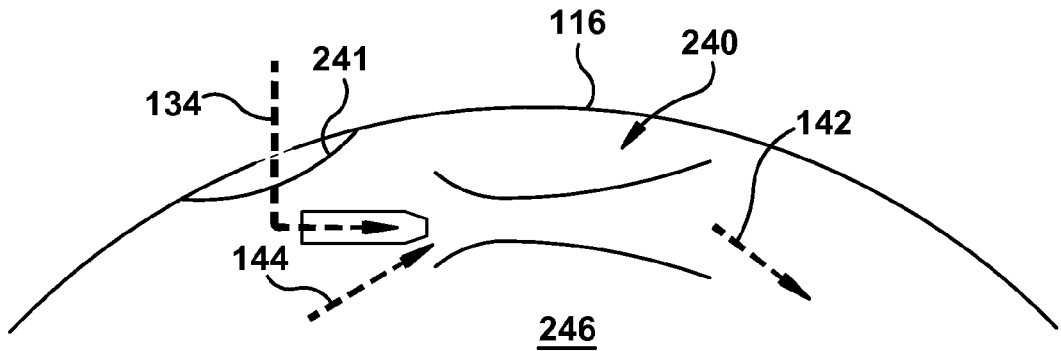
FIG. 7 shows a schematic cross-sectional view of an ejector according to another embodiment of the present invention.
Figure 8:
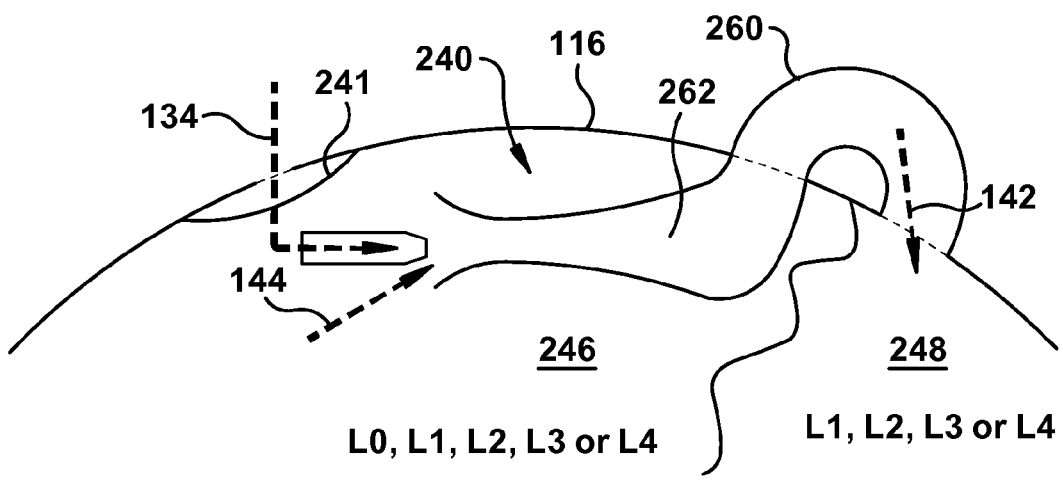
FIG. 8 shows a schematic cross-sectional view of an ejector according to another embodiment of the present invention.

Referring to FIGS. 7-8, in another embodiment, an ejector 240 may be mounted internally to second casing 116. Ejector 240 includes similar structure to that described above, except that chamber 150 may not be necessary and insulation 241 (e.g., baffles, bushing) may be required to protect casing 116 from the temperatures of steam portion 134. FIG. 7 shows an embodiment in which ejector 240 is positioned within an upstream chamber 246 of a single stage of a turbine. FIG. 8 shows another embodiment in which ejector 240 is positioned within an upstream chamber 246 of a given stage and mixture 142 is introduced into an upstream chamber 248 of a preceding, different stage than the given stage. In this case, a passage 260 may be provided from an output 262 through second casing 116 to the preceding different stage 248 of second turbine 106.

Ejector 140, 240 may be formed out of any material sufficient to endure the temperature and pressure of the steam communicated therethrough such as stainless steel.

While embodiments of the invention have been described relative to high pressure, first turbine 102 supplying the hotter steam portion 134 for mixing with steam portion 144 from a low pressure second turbine 106, it is understood that the teachings of the invention are not so limited. That is, hotter steam at low pressures from any source may be mixed with steam from any downstream, lower temperature turbine and introduced back into that downstream turbine. Hence, a method according to embodiments of the invention may include collecting a flow of steam 130 from an end packing 112 of a first casing 110 that encloses a first turbine 102 that operates at a first temperature $T_1$ or obtaining source of steam 132 from another location providing steam at similar conditions. A mixture 142 may be formed of at least a portion 134 of the flow of steam 130 and a portion of steam 144 removed from an upstream chamber 146 of a given stage of a second turbine 106 that operates at a second temperature $T_2$ that is less than the first temperature $T_1$. Mixture 142 is introduced into second turbine 106 (either in the same given stage or a preceding stage).

The terms "first," "second," and the like, herein do not denote any order, quantity, or importance, but rather are used to distinguish one element from another, and the terms "a" and "an" herein do not denote a limitation of quantity, but rather denote the presence of at least one of the referenced item. The modifier "about" used in connection with a quantity is inclusive of the stated value and has the meaning dictated by the context, (e.g., includes the degree of error associated with measurement of the particular quantity). The suffix "(s)" as used herein is intended to include both the singular and the plural of the term that it modifies, thereby including one or more of that term (e.g., the metal(s) includes one or more metals). Ranges disclosed herein are inclusive and independently combinable (e.g., ranges of "up to about 25 wt %, or, more specifically, about 5 wt % to about 20 wt %", is inclusive of the endpoints and all intermediate values of the ranges of "about 5 wt % to about 25 wt %," etc).

While various embodiments are described herein, it will be appreciated from the specification that various combinations of elements, variations or improvements therein may be made by those skilled in the art, and are within the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A steam turbine comprising:
   a first casing including a first turbine operably coupled to a rotating shaft and operable at a first temperature and an end packing for partially sealing the first casing with the rotating shaft;
   a steam seal regulator for accepting a flow of steam from the end packing of the first casing;
   a second casing including a second turbine operably coupled to the rotating shaft and operable at a second temperature that is less than the first temperature,
   wherein the second casing is separated from the first casing; and
   an ejector for forming a mixture of at least a portion of the flow of steam from the steam seal regulator and a portion of steam removed from an upstream chamber of a given stage of the second turbine and introducing the mixture into the second turbine.

2. The steam turbine of claim 1, wherein the mixture is introduced into the upstream chamber of the given stage.

3. The steam turbine of claim 1, wherein the second turbine includes a plurality of stages, and the mixture is introduced into an upstream chamber of a preceding, different stage of the second turbine than the given stage.

4. The steam turbine of claim 1, wherein the ejector includes a chamber mounted externally to the second casing, the chamber including openings in fluid communication with an interior of the second casing and the steam seal regulator.

5. The steam turbine of claim 4, wherein the ejector includes a diffuser mounted in the chamber having an input for receiving the at least a portion of the flow of steam from the steam seal regulator and the portion of steam removed from the given stage of the second turbine.

6. The steam turbine of claim 5, wherein the ejector further includes a nozzle mounted in the chamber for introducing the at least a portion of the flow of steam from the steam seal regulator to the input of the diffuser, wherein a flow of steam from the nozzle pulls the portion of steam from the upstream chamber of the given stage of the second turbine.

7. The steam turbine of claim 5, wherein the ejector further includes a mechanical pump for pulling the portion of steam from the upstream chamber of the given stage of the second turbine and introducing the portion with the at least a portion of the flow of steam from the steam seal regulator to the input of the diffuser.

8. The steam turbine of claim 1, wherein the ejector is mounted internally to the second casing.

9. The steam turbine of claim 8, wherein the ejector includes a diffuser having an input for receiving the at least a portion of the flow of steam from the steam seal regulator and the portion of steam removed from the given stage of the second turbine.

10. The steam turbine of claim 9, wherein the ejector further includes a nozzle for introducing the at least a portion of the flow of steam from the steam seal regulator to the input of the diffuser, wherein a flow of steam from the nozzle pulls the portion of steam from the upstream chamber of the given stage of the second turbine.

11. The steam turbine of claim 1, wherein the second turbine includes a plurality of stages, the ejector is mounted internally to the second casing and the mixture is introduced into an upstream chamber of a preceding, different stage of the second turbine than the given stage, and further comprising a passage from an output of the ejector through the second casing to the preceding different stage of the second turbine.

12. An apparatus comprising:
an ejector for:
forming a mixture of:
steam from a source having a first temperature, the source including a first turbine enclosed within a first casing, and
a portion of steam removed from an upstream chamber of a given stage of a second turbine enclosed within a second casing that is operable at a second temperature that is less than the first temperature; and
introducing the mixture into the second turbine, wherein the first turbine within the first casing is separated from the second turbine within the second casing.

13. The apparatus of claim 12, wherein the mixture is introduced into the upstream chamber of the given stage of the second turbine.

14. The apparatus of claim 12, wherein the second turbine includes a plurality of stages and the mixture is introduced into an upstream chamber of a preceding, different stage of the second turbine than the given stage.

15. The apparatus of claim 12, wherein the ejector includes a chamber mounted externally to the second casing that encloses the second turbine, the chamber including openings in fluid communication with an interior of the second casing and a source of high temperature, low-pressure steam.

16. The apparatus of claim 15, wherein the ejector includes a diffuser mounted in the chamber having an input for receiving the at least a portion of the flow of steam from the source of high temperature, low-pressure steam and the portion of steam removed from the given stage of the second turbine.

17. The apparatus of claim 16, wherein the ejector further includes a nozzle mounted in the chamber for introducing the at least a portion of the flow of steam from the source of high temperature, low-pressure steam to the input of the diffuser, wherein a flow of steam from the nozzle pulls the portion of steam from the upstream chamber of the given stage of the second turbine.

18. The apparatus of claim 12, wherein the ejector is mounted internally to the second casing that encloses the second turbine.

19. The apparatus of claim 18, wherein the ejector includes:
a diffuser having an input for receiving the at least a portion of the flow of steam from a nozzle and the portion of steam removed from the given stage of the second turbine, and
wherein a flow of steam from the nozzle pulls the portion of steam from the upstream chamber of the given stage of the second turbine.

20. A steam turbine comprising:
a first turbine operable at a first temperature, the first turbine enclosed within a first casing;
a source of steam, the steam having a second temperature that is higher than the first temperature, the source of steam including a second turbine enclosed within a second casing, the second casing being separated from the first casing; and
an ejector for forming a mixture of at least a portion of a flow of steam from the source of steam and a portion of steam removed from an upstream chamber of a given stage of the first turbine and introducing the mixture into the first turbine.

* * * * *